Aug. 10, 1965  J. B. FREED  3,199,835
SLEEVE LINED PLUG VALVES
Filed Aug. 31, 1961  4 Sheets-Sheet 1
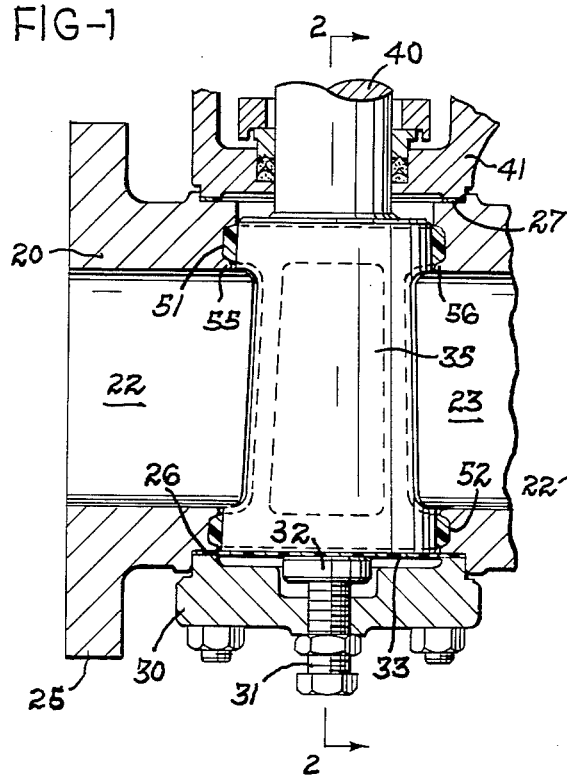
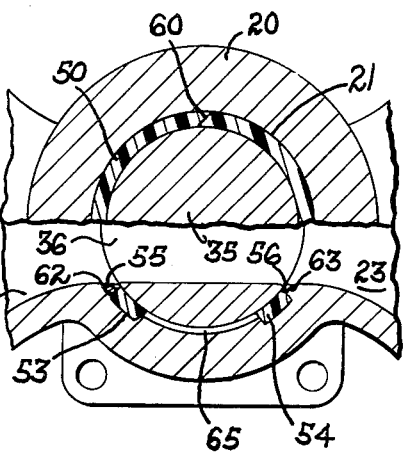
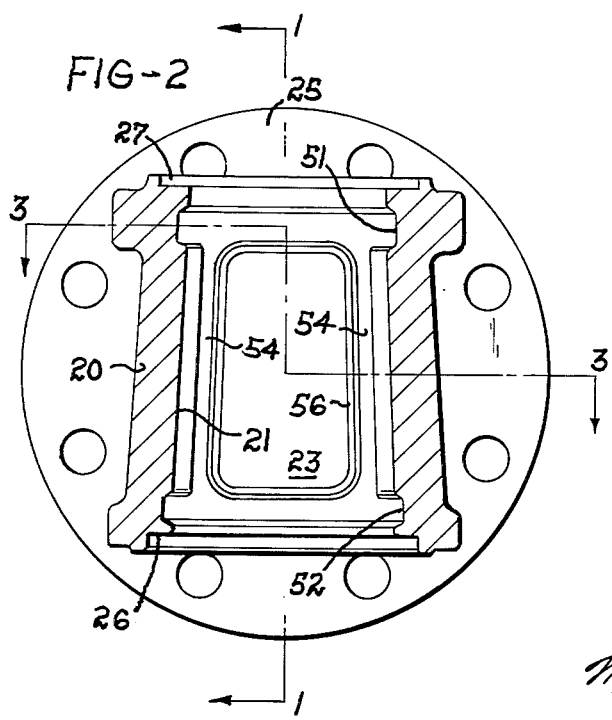
INVENTOR.
JACOB B. FREED
BY Marshall, Biebel, French & Bugg
ATTORNEYS

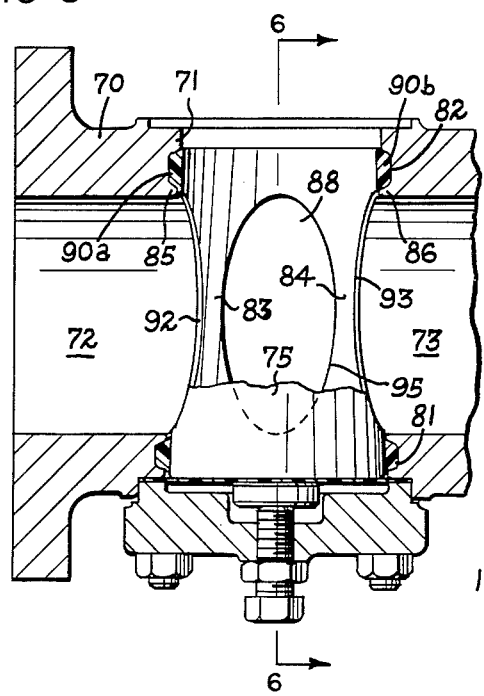
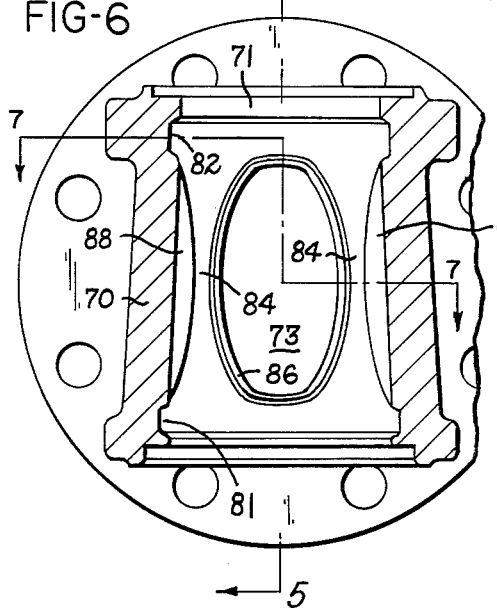
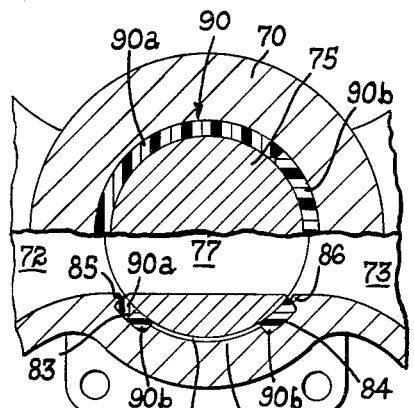
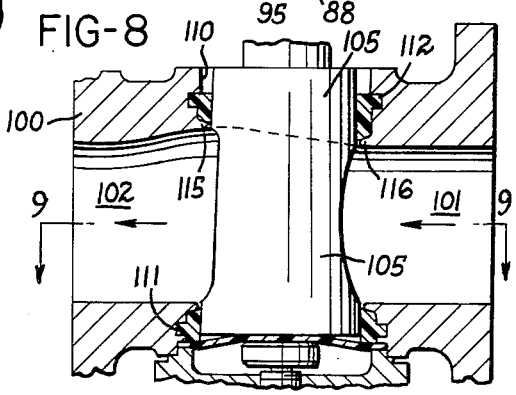
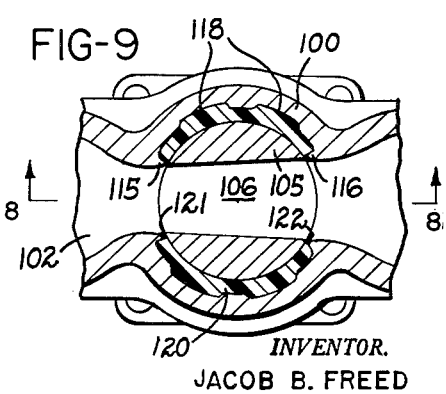

Aug. 10, 1965  J. B. FREED  3,199,835
SLEEVE LINED PLUG VALVES
Filed Aug. 31, 1961  4 Sheets-Sheet 3
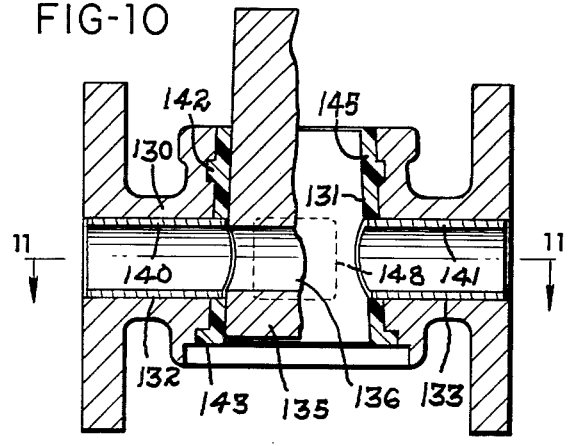
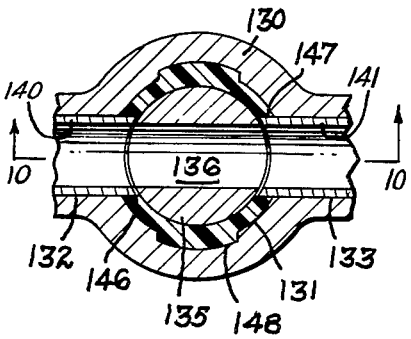
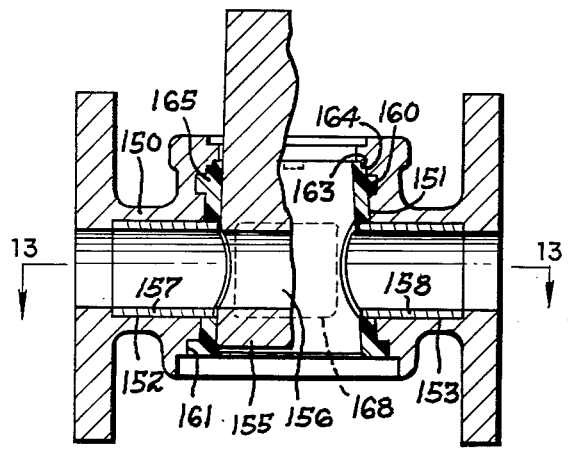
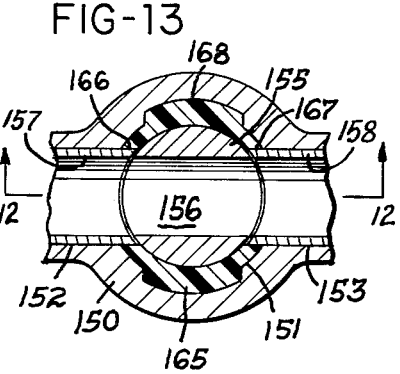
INVENTOR.
JACOB B. FREED
BY
Marechal, Biebel, French & Bugg
ATTORNEYS

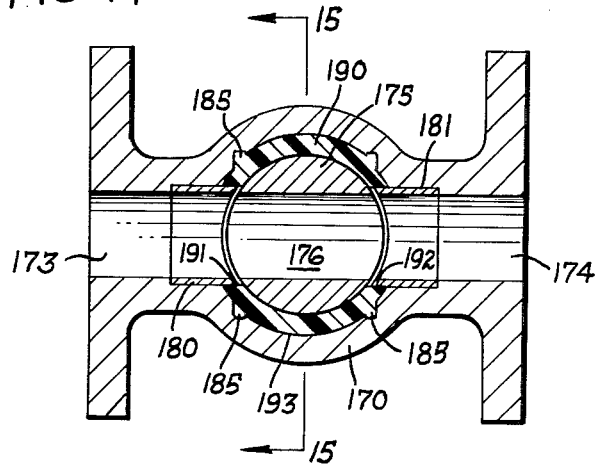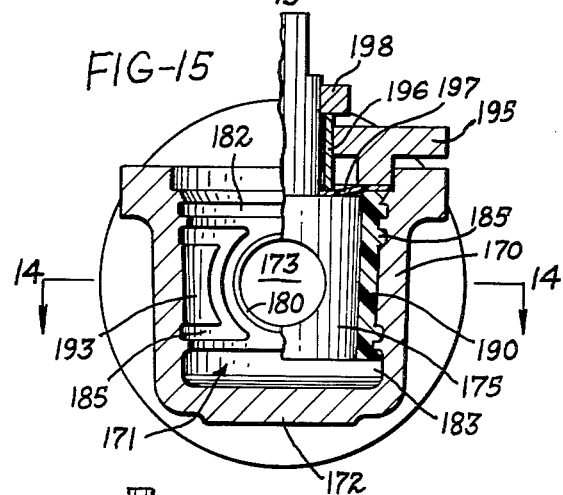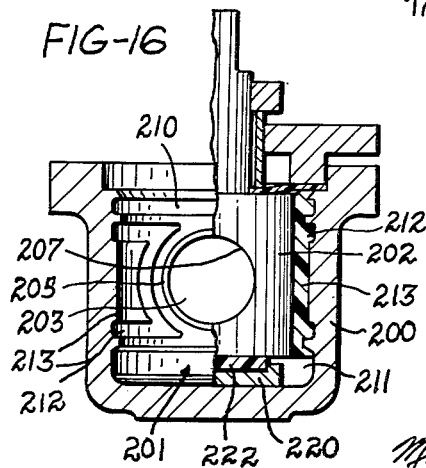

United States Patent Office 3,199,835
Patented Aug. 10, 1965

3,199,835
SLEEVE LINED PLUG VALVES
Jacob B. Freed, Dayton, Ohio, assignor to The Duriron Company, Inc., Dayton, Ohio, a corporation of New York
Filed Aug. 31, 1961, Ser. No. 135,298
12 Claims. (Cl. 251—309)

This invention relates to sleeve lined plug valves.

The invention is especially related to plug valves employing liner sleeves fabricated of a fluorocarbon material such particularly as one of the polytetrafluoroethylene materials sold under the trade name Teflon. These Teflon materials have definite practical advantages for use in the lining of plug valves from the standpoint of their inert nature, resilience and anti-frictional properties, as is pointed out in a number of patents assigned to the same assignee as this application, including Robert C. Schenck Nos. 2,713,987 and 2,729,420, Deas Sinkler No. 2,776,104, Jacob B. Freed No. 2,961,214, and Schenck and Freed No. 2,987,295.

The present invention is particularly concerned with the problem discussed in detail in the above Sinkler patent, namely the maintaining of proper sealing of a Teflon sleeve lined valve over a substantial range of temperatures. More specifically, Teflon has a very much higher coefficient of thermal expansion than metal, and if a Teflon sleeve lined valve is assembled and adjusted to sealing condition at room temperature, then if the operating temperature increases, the pressure on the sleeve will increase at a substantial rate. This in itself is not entirely undesirable if thereafter the operating temperature remains fairly consistent, but it may create major difficulties in the event of substantial fluctuations in temperature.

The point just discussed is of substantial importance in installations where, for example, the pipe line and valve normally operate in a comparatively low temperature range but are from time to time flushed out with steam for cleaning purposes. If the liner sleeve is capable of permanent deformation during such high temperature treatment, then when the valve cools down, the sleeve may no longer provide effective sealing.

It is a major object of the present invention to provide a sleeve lined plug valve construction of the above type which is essentially free of the above disadvantages, and particularly which is of such construction that the liner material is confined against expansion capable of causing permanent deformation and which will therefore maintain effective sealing over wide ranges of temperature and pressure.

It is a specific object of the invention to provide a sleeve lined valve wherein the liner material is confined in the vicinity of the body ports in such manner that it provides high sealing pressure around the ports over a wide temperature range with minimum possibility of flow into the ports.

A further object of the invention is to provide a sleeve lined valve wherein the inner end of each body port is formed by an annular shoulder which projects inwardly of the bore into interfitting relation with the ports in the liner sleeve and thereby confines the surrounding portions of the liner material both against movement with respect to the ports and also against extrusion into the ports.

A still further object of the invention is to provide a sleeve lined valve wherein the liner material is confined against movement with respect to the bore at both ends thereof and also in the vicinity of the body ports in such manner that it has minimum possibility of extrusion into the ports or other permanent deformation even at high temperatures and pressures.

Additional objects and advantages of the invention will be apparent from the following description, the accompanying drawings and the appended claims.

In the drawings—

FIG. 1 is a view in axial section through a sleeve lined plug valve constructed in accordance with the invention, the view being taken substantial on the line 1—1 of FIG. 2 and showing the plug in elevation and in the fully opened position;

FIG. 2 is a view on the line 2—2 of FIG. 1 showing the valve body with the plug and liner sleeve removed;

FIG. 3 is a sectional on two levels taken as indicated by the line 3—3 of FIG. 2;

FIG. 4 is an enlarged fragment of FIG. 3;

FIG. 5 is a view similar to FIG. 1 showing another form of plug valve constructed in accordance with the invention, the view being taken on the line 5—5 of FIG. 6;

FIG. 6 is a section on the line 6—6 of FIG. 5 showing the interior of the valve body with the plug and liner sleeve removed;

FIG. 7 is a section on two levels taken as indicated by the line 7—7 of FIG. 6;

FIG. 8 is an axial section on the line 8—8 of FIG. 9 showing another form of the plug valve in accordance with the invention;

FIG. 9 is a section on the line 9—9 of FIG. 8;

FIG. 10 is a section on the line 10—10 of FIG. 11 showing the body and liner sleeve of another form of plug valve in accordance with the invention;

FIG. 11 is a section on the line 11—11 of FIG. 10 and showing the valve plug also in place;

FIG. 12 is a view similar to FIG. 10 taken on the line 12—12 of FIG. 13 and showing another form of the plug valve in accordance with the invention;

FIG. 13 is a section on the line 13—13 of FIG. 12 with the plug in position;

FIG. 14 is a section on the line 14—14 of FIG. 15 showing still another form of plug valve constructed in accordance with the invention;

FIG. 15 is a section on the line 15—15 of FIG. 14 with one half of the plug and liner sleeve removed; and FIG. 16 is a view similar to FIG. 15 showing a plug valve in accordance with the invention wherein the plug and bore are both cylindrical.

Referring to the drawings, which illustrate preferred embodiments of the invention, the valve in FIGS. 1–4 includes a valve body 20 having a conical bore 21 extending transversely therethrough and the ports 22 and 23 intersect this bore from opposite sides of the valve body. It should be noted that the term "bore" is used somewhat loosely since this portion of the body may not require boring or other machining. Suitable flanges 25 are provided at the outer ends of the ports for attachment to adjoining pipe members in the usual way, and each end of the bore 21 is shown as counterbored to provide a pair of shoulders 26 and 27.

The bore 21 is closed at its lower end by a cap 30 which seats on the shoulder 26 and carries a pressure screw 31 operating through a thrust member 32 and diaphragm 33 to maintain upward pressure on the larger end of the tapered valve plug 35 which is provided with a through port 36 for alignment with the body ports 22 and 23. The smaller end of the plug 35 includes a stem portion 40 which projects through a retainer 41 mounted on the upper end of the body and seating on the shoulder 27. The retainer 41 supports a sealing ring 42, gland 43 and gland follower 44 which is adjustable in the usual way on the retainer 41 to maintain sealing pressure between the stem 40 and retainer 41.

The plug 35 is of sufficiently smaller radial dimensions than the bore 21 to establish an annular clearance between their opposed surfaces, and this clearance receives sleeve liner means 50 for maintaining a continuously sealed condition between the plug and the bore, particularly at the ends of the bore and around both of the body ports 22 and 23. A major feature of the present invention resides in the construction and cooperative relation between the bore and the liner means as now described.

Referring particularly to FIGS. 1–3, the bore 21 is provided with a continuous circumferential groove 51 located between the ports 22–23 and the shoulder 27, and a similar continuous groove 52 extends around the bore between the body ports and the shoulder 26. A pair of grooves 53 extend between the grooves 51 and 52 on either side of the port 22, and a similar pair of grooves 54 extend between the grooves 51 and 52 on either side of the port 23. This groove arrangement is therefore such that the grooves 53 and the connecting portions of the grooves 51 and 52 therebetween form in effect a continuous annular groove surrounding the port 22, and the portion of the bore surrounded by this continuous groove arrangement in turn defines an annular shoulder 55 forming the inner end of the port 22. The grooves 54 and associated portions of the grooves 51 and 52 similarly form a continuous annular groove surrounding the port 23 and defining a shoulder 56 which forms the inner end of this port.

The sleeve liner means 50 is shown as formed of a sheet of fluorocarbon material cut generally as a mirror image of the groove pattern in the bore 21 for reception in the grooves 51–54. The thickness of the liner means is such that when it is thus received in the several grooves, it will extend inwardly to a sufficient distance beyond the inner ends of the shoulders 55 and 56 to maintain the plug 35 out of contact with these shoulders throughout the full range of operational conditions of the valve. As shown particularly in FIG. 3, the ends of the sleeve 50 are cut on a bevel at 60 to overlap in assembled position and thereby impart a cage configuration to the sleeve 50, and this is a simple and inexpensive procedure for fabricating the sleeve, but it could also be made as a continuous piece if desired and forced axially into position.

It will be seen that in the assembled condition of the valve as illustrated, there are continuous portions of the liner sleeve 50 which surround the shoulders 55 and 56 respectively and thereby define the ports through the liner means, which are accordingly identified as 62 and 63 respectively. The shoulders 55 and 56 in turn cooperate with the opposed walls of the grooves 51–54 to confine the surrounding liner material against movement with respect to the bore and particularly against extrusion into the body ports themselves. This action is indicated in the enlarged detail in FIG. 4, which represents the preferred arrangement wherein the shoulder 55 projects more than half way through the liner port 62 to provide maximum protection against extrusion of the liner material therepast and into the port 23.

The confining action of the shoulders 55 and 56 as described is supplemented by that of the grooves 51 and 52 in confining the end portions of the liner sleeve from movement axially of the bore around the entire circumference of both ends of the bore. This compound confining action has been found to be highly effective in maintaining seals even at very high temperatures and pressures. At the same time, the construction of the liner sleeve with the areas between the ports on both sides of the bore cut out to provide pockets 65 (one being shown in FIGS. 3 and 4) minimizes the total area of sealing engagement between the plug and the liner and correspondingly reduces the torque required to turn the plug. Other configurations of bore and linear means providing similar advantages are possible, however, as will be described in connection with other embodiments of the invention, but a three-inch valve constructed as shown in FIGS. 1–4 has been tested successfully at 230 p.s.i. after each of more than fifteen cycles in which the temperature of the valve was raised to 350° F. and then returned to room temperature.

The valve shown in FIGS. 5–7 is generally similar to the valve of FIGS. 1–4, and those of the parts therein which are of identical construction have been given similar reference characters and need not be further described. The valve body 70 has a bore 71 which ports 72 and 73 intersect from opposite sides, and the plug 75 and its through port 77 are similar to the plug 35. Instead of the generally trapezoidal shape of the ports in valve body 20, however, the ports 72, 73 and 77 are generally oval.

The bore 71 is provided with circumferential grooves 81 and 82 adjacent opposite ends thereof which are similar to the grooves 51 and 52 in valve body 20. The pair of grooves 83 which surround the ports 72, however, are contoured to match the oval outline of the port, and the same is true of the pair of grooves 84 which surround the port 73. These groove arrangements therefore provide annular shoulders 85 and 86 which form the inner ends of the ports 72–73. In addition, the groove arrangement results in a pair of generally oval bosses 88 located between the body ports and of approximately the same proportions.

The sleeve liner means 90 which is received in the clearance between the bore 71 and plug 75 is shown as formed in two pieces, identified as 90a and 90b respectively, which are of the same size and shape. Each of these liner pieces is provided with a port 92 or 93 proportioned to receive one of the shoulders 85 or 86, and also with a pair of similar openings 95 which receive the bosses 88. The junction between the two pieces of the liner means thus extends through one of each of the grooves 83 and 84, but this offers no problem since it is simple to provide suitable stops limiting rotation of the plug to a total of 90° in clockwise direction from the open position of FIG. 7 so that the plug port 77 never crosses the junction between liner ports.

The valve of FIGS. 5–7 possesses the same novel characteristics and advantages described in connection with the valve of FIGS. 1–4. The shouldesr 85 and 86 inter fit with the liner ports 92 and 93 to confine the surrounding ring portions of liner material against movement with respect to the bore and flow into the body ports, and the grooves 72 and 73 similarly confine the end portions of the liner means against movement axially of the bore away from the ports. This arrangement provides effective sealing over a wide range of temperatures and pressures while at the same time requiring comparatively low torque due to the relief provided by the spaces between the bosses 88 and the plug.

FIGS. 8 and 9 illustrate the application of the invention to a value of the type disclosed in Schenck and Freed Patent No. 2,987,295 wherein the ports of the body and plug are differently contoured in order to assure throttling of the flow at the downstream end of the plug port. Thus the valve body 100 is provided with an inlet port 101 which is shorter in an axial direction and wider than its outlet port 102, and the plug 105 has a through port 106 which is internally contoured so that its opposite ends properly match the body ports.

The bore 110 in the valve body 100 is provided with circumferential grooves 111 and 112 adjacent opposite ends. In addition, the bore is provided with a pair of annular shoulders 115 and 116 which form the inner ends of the body ports as described in connection with FIGS. 1–7 and project into the clearance between the bore and the plug. The wall of the bore between the ports is also shown as provided with a plurality of indentations or pockets 118 providing relief into which the material of the liner sleeve 120 is received as described particularly in the copending application of Jacob B. Freed, Serial No. 38,618, filed June 24, 1960, and assigned to the same assignee as this application.

The liner sleeve 120 in FIGS. 8 and 9 is shown as formed in a single piece and is preferably fabricated and installed in the manner described in the above Freed application. As shown, it is provided with ports 121 and 122 proportioned for interfitting over the shoulders 115 and 116 so that it is confined thereby against movement with respect to the bore and flow into the body ports. The confining action of the grooves 111 and 112 on the ends of the liner sleeve is similar to that already described in connection with FIGS. 1–7 and also in the above Freed application.

Referring now to FIGS. 10 and 11, the valve body 130 has a tapered bore 131 which ports 132 and 133 of circular section intersect from opposite sides, and the plug 135 is similar to the plug 35 and includes a circular through port 136. Each of the ports 132 and 133 is provided with a cylindrical insert sleeve 140 and 141 respectively of stainless steel or other suitable metal which projects into the clearance between the bore 131 and plug 135 and thus forms an annular shoulder corresponding in function to the shoulders which surround the body ports in the other forms of valve already described.

The bore 131 is provided with circumferential grooves 142 and 143 adjacent opposite ends thereof, and the liner sleeve 145 includes integral portions which are received in these grooves and is also provided with ports 146 and 147 which interfit around the inner ends of the sleeves 140 and 141. In addition, the wall of the bore 131 is provided with recesses or pockets 148 in the areas spaced between the ports and the grooves 142 and 143 to provide relief spaces into which the material of the liner sleeve is received for the dual purpose of increasing the locking of the liner in the bore and also reducing the torque required to turn the plug. In the use of this valve, the annular shoulders provided by the inner ends of the port insert sleeves 140 and 141 interfit with the liner ports in the same manner as described in connection with the valves of FIGS. 1–9 to confine the liner material against movement relative to the bore and flow into the body ports, and the ends of the liner sleeve are also confined by the grooves 142 and 143 similarly to the other valves as already described.

The valve of FIGS. 12 and 13 is similar to that of FIGS. 10 and 11, including a valve body 150 having a tapered bore 151 which ports 152 and 153 of circular section intersect from opposite sides. The plug 155 may be identical with the plug 135 and includes a circular through port 156. Each of the ports 152 and 153 is provided with a cylindrical insert sleeve 157 and 158, respectively, which projects into the clearance between the bore 151 and plug 155 to form an annular shoulder.

The bore 151 is provided with circumferntial grooves 160 and 161 adjacent opposite ends thereof, and it is also provided with an annular shoulder 163 near its smaller end which projects inwardly of the adjacent surface of the bore and has a plurality of lug portions 164 along its inner periphery. The liner sleeve 165 includes integral portions which are received in the grooves 160 and 161, and it is provided with ports 166 and 167 which interfit around the inner ends of the insert sleeves 157 and 158. The shoulder 163 cooperates with the groove 161 in confining the end of the liner sleeve from possible extrusion out of the bore, and the lugs 164 interfit with the end of the liner sleeve to give added locking against angular movement. The wall of the bore 151 is also shown as provided with recesses or pockets 168 similar to the pockets 148 which provide relief spaces for receiving the material of the liner sleeve as already described. Otherwise, this valve and its mode of operation is essentially as described in connection with the valve of FIGS. 10 and 11.

FIGS. 14 and 15 show a valve similar to those of FIGS. 10–13 but of the type wherein the body 170 has a tapered bore 171 which extends therethrough from the top and is closed at its smaller end by an integral portion 172 of the body. The ports 173 and 174 of circular section open into opposite sides of the bore 171, and the plug 175 has a circular through port 176.

The inner end portion of each of the ports 173 and 174 is enlarged to receive an insert sleeve 180 and 181, respectively, which projects into the clearance between the bore 171 and plug 175 similarly to the sleeves 140 and 141 in FIGS. 10 and 11. The upper end of the bore 171 is provided with a circumferential groove 182 near its upper end with a circumferential groove 183 at its lower end. In addition, the surface of the bore between these grooves and the ports is provided with a pair of continuous grooves 185, which run parallel with the circumferential grooves along their top and bottom portions and which are curved to surround the insert sleeves 180 and 181 at their end portions.

The liner sleeve 190 is shown as formed in a single piece and may be assembled in position as described in the above noted Freed application. Integral portions of the liner are received in all of the grooves in the body, and the liner ports 191 and 192 interfit around the inner ends of the port insert sleeves 180 and 181 and are confined thereby against movement with respect to the bore and flow into the body ports. The grooves 185 serve both to provide relief for the liner sleeve and also to lock the adjacent portion of the liner sleeve against movement with respect to the bore. In addition, the bore areas 193 bordered by the grooves 185 are preferably ground to a slightly increased radius to provide added relief space for the liner sleeve. The liner sleeve 190 is confined at its upper end by a cap 195 which is bolted to the valve body in the usual way, and sealing pressure of the plug with the liner sleeve is maintained by means of a gland 196 which engage the upper surface of the plug through the diaphragm 197 and is forced against the plug by the gland follower 198 adjustably secured to the cap 195 in the usual way.

FIG. 16 shows a valve similar to that of FIGS. 14 and 15 except that the body 200 is provided with a cylindrical bore 201, and also the valve plug 202 is cylindrical rather than tapered like the plugs in the valves of FIGS. 1–15. The body 200 has a pair of ports of circular section, only one 203 being shown and each of these ports is arranged similarly to the ports in the body 170 to receive a metal insert sleeve 205. The plug 202 similarly has a circular through port 207. The groove pattern within the valve body 200 is similar to that in the body 170 and includes circumferential grooves 210 and 211 at opposite ends of the body and a continuous groove 212 on each side of the bore similar to the grooves 185. The areas 213 bordered by the groove 212 are shown as ground to provide additional relief space for the liner sleeve 215 which is essentially identical with the liner sleeve 190 except that it is cylindrical rather than tapered. The liner sleeve 215 accordingly has a pair of ports which interfit around the shoulders provided by the inner ends of the insert sleeves 205 in the same manner as shown for the valve in FIG. 14.

The construction of the valve parts at the upper end of the valve body is the same as in FIG. 15, and similar reference characters have been used. Since the valve plug is cylindrical, it is necessary to provide a positive stop for its movement inwardly of the body, and this is provided by a metal plate 220 having its upper surface recessed to receive a thrust washer 222 which is preferably of the same fluorocarbon material as the liner sleeve 215. In the assembly of the valve of FIG. 16, it is desirable to follow the procedure disclosed in the above noted Freed application involving sizing at room temperature followed by heating, and this procedure has been found to result in a valve which will maintain effective sealing over a wide range of temperatures and pressures.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. In a sleeve lined plug valve including a metallic body having a bore extending transversely thereof and ports therethrough opening into said bore in angularly spaced relation, the combination of a tapered metallic valve plug received in said bore and having a port therethrough for alignment with said body ports, means to effect movement of said plug from one position to another relative to said body to place said plug port in and out of fluid communication with said body port, said plug being of sufficiently smaller radial dimensions than said bore to establish an annular clearance between the opposed surfaces thereof, sleeve liner means received in said clearance and having ports therein matching said body ports, means maintaining said plug in sealing engagement with said liner means during movement from one position to another, said liner means being formed of a fluorocarbon material having a coefficient of thermal expansion substantially greater than that of said plug and body, said bore having a continuous annular groove surrounding each of said body ports, said body including an annular shoulder forming the inner wall of each said annular groove and also the inner end of the associated said body port, said liner means including means defining a continuous circumferential seal extending completely around the outer periphery of said plug, said liner means including integral portions received in said grooves and providing a continuous ring portion of said liner material surrounding said body ports, said shoulders interfitting with said liner ports to confine said surrounding rings of liner material against movement with respect to said bore and flow into said body ports, and said ring portions of said liner means being of sufficient thickness to maintain said plug out of contact with said shoulders.

2. In a sleeve lined plug valve including a metallic body having a bore extending transversely thereof and ports therethrough opening into said bore in angularly spaced relation, the combination of a tapered metallic valve plug received in said bore and having a port therethrough for alignment with said body ports, means to effect movement of said plug from one position to another relative to said body to place said plug port in and out of fluid communication with said body ports, said plug being of sufficiently smaller radial dimensions than said bore to establish an annular clearance between the opposed surfaces thereof, sleeve liner means received in said clearance and having ports therein matching said body ports, means maintaining said plug in sealing engagement with said liner means during movement from one position to another, said liner means being formed of a fluorocarbon material having a coefficient of thermal expansion substantially greater than that of said plug and body, said liner means being generally tubular in shape and providing substantially continuous seal areas circumferentially engaging the outer periphery of said plug, said bore having a continuous annular groove surrounding each of said body ports, said body including an annular shoulder forming the inner wall of each said annular groove and also the inner end of the associated said body port, said bore also having therein means defining a pair of circumferential grooves located respectively adjacent opposite ends thereof and in axially spaced relation with said ports therein, said liner means including integral portions received in said grooves and cooperating with the edges of said circumferential grooves to confine the end portions of said liner means against movement axially of said bore away from said ports, and said shoulders interfitting with said liner ports to confine the surrounding portions of said liner means against movement with respect to said bore and flow into said body ports.

3. In a sleeve lined plug valve including a metallic body having a bore extending transversely thereof and inlet and outlet ports therethrough opening into said bore in angularly spaced relation, the combination of a tapered metallic valve plug received in said bore and having a port therethrough for alignment with said body ports, means to effect movement of said plug from one position to another relative to said body to place said plug port in and out of fluid communication with said body ports, said plug being of sufficiently smaller radial dimensions than said bore to establish an annular clearance between the opposed surfaces thereof, sleeve liner means received in said clearance and having ports therein matching said body ports, means maintaining said plug in sealing engagement with said liner means during movement from one position to another, said liner means being formed of a fluorocarbon material having a coefficient of thermal expansion substantially greater than that of said plug and body and being generally tubular in shape to provide substantial sealing area between the opposed surfaces of said plug and bore, said body including an annular shoulder forming the inner end of each said body port and projecting into said clearance beyond the surrounding portion of said bore, said bore having therein means defining a pair of circumferential grooves located respectively adjacent opposite ends thereof and in axially spaced relation with said ports therein, said liner means including integral portions received in said grooves and cooperating with the edges thereof to confine said liner means against movement axially of said bore away from said ports, said shoulders interfitting with said liner ports to confine the surrounding portions of said liner means against movement with respect to said bore and flow into said body ports, and said liner means being of sufficient thickness to maintain said plug out of contact with said shoulders.

4. A sleeve lined plug valve as set forth in claim 3 wherein said annular shoulder forming the inner end of each said body port is integral with said body.

5. A sleeve lined plug valve as set forth in claim 3 wherein said pair of circumferential grooves are continuous and wherein said integral portions of said liner fill said grooves.

6. A plug valve as described in claim 3, wherein said plug and said sleeve and said body are so constructed and arranged that during movement of said plug for placing said plug passageway out of communication with said inlet port, the outlet port of said body closes entirely while the interior of said plug port continues in direct fluid receiving relation with said inlet port of said body.

7. In a sleeve lined plug valve including a metallic body having a bore extending transversely thereof and inlet and outlet ports therethrough opening into said bore in angularly spaced relation, the combination of a tapered metallic valve plug received in said bore and having a port therethrough for alignment with said body ports, means to effect movement of said plug from one position to another relative to said body to place said plug port in and out of fluid communication with said body ports, said plug being of sufficiently smaller radial dimensions than said bore to establish an annular clearance between the opposed surfaces thereof, sleeve liner means received in said clearance and having ports therein matching said body ports, means maintaining said plug in sealing engagement with said liner means during movement from one position to another, said liner means being formed of a fluorocarbon material having a coefficient of thermal expansion substantially greater than that of said plug and body and being generally tubular in shape to provide substantial sealing area between the opposed surfaces of said plug and bore, said body including an annular shoulder forming the inner end of each said body port and projecting into said clearance beyond the surrounding portion of said bore, said bore having therein circumferential groove means in axially spaced relation with said ports therein, said liner means including integral portions received in said groove means and cooperating with the edges thereof to confine said liner means against movement axially of said bore with respect to said ports, said bore including pockets between said body ports receiving portions of said liner means and providing relief areas for said liner means, said shoulders interfitting with said liner ports to confine the surrounding portions of said liner means against movement with respect to said bore and flow into said body ports, and said liner means being of sufficient thickness to maintain said plug out of contact with said shoulders.

8. A sleeve lined plug valve as set forth in claim 7 wherein said annular shoulder forming the inner end of each said body port is integral with said body.

9. A sleeve lined plug valve as set forth in claim 7 wherein said liner and said body are so constructed and arranged that during movement of said plug for placing said plug passageway out of communication with said inlet port, the outlet port of said body closes entirely while the interior of said plug port continues in direct fluid receiving relation with said inlet port of said body.

10. In a sleeve lined plug valve including a metallic body having a bore extending transversely thereof and ports therethrough opening into said bore in angularly spaced relation, the combination of a tapered metallic valve plug received in said bore and having a port therethrough for alignment with said body ports, means to effect movement of said plug from one position to another relative to said body to place said plug port in and out of fluid communication with said body ports, said plug being of sufficiently smaller radial dimensions than said bore to establish an annular clearance between the opposed surfaces thereof, sleeve liner means received in said clearance and having ports therein matching said body ports, said liner means being formed of a fluorocarbon material having a coefficient of thermal expansion substantially greater than that of said plug and body, means maintaining said plug in sealing engagement with said liner means during movement from one position to another, said body including an annular shoulder forming the inner end of each said body port and projecting into said clearance beyond the surrounding portion of said bore, said liner means being generally tubular in shape and providing substantially continuous seal areas circumferentially engaging the outer periphery of said plug, said bore having therein means defining a pair of continuous circumferential grooves located respectively adjacent opposite ends thereof and in axially spaced relation with said ports therein, said liner means covering substantially the entire surface of said bore and including integral portions filling said grooves and cooperating with the edges thereof to confine said liner means against movement axially of said bore away from said ports, said shoulders interfitting with said liner ports to confine the surrounding portions of said liner means against movement with respect to said bore and flow into said body ports, said liner means being of sufficient thickness to maintain said plug out of contact with said shoulders, and said bore having recesses in the surface areas thereof spaced between said ports and between said grooves for receiving portions of said liner means therein to relieve the torque required to turn said plug.

11. In a lined plug valve including a metallic body having a bore extending transversely thereof and inlet and outlet ports therethrough opening into said bore in angularly spaced relation, the combination of a tapered metallic valve plug received in said bore and having a port therethrough for alignment with said body ports, means to effect movement of said plug from one position to another relative to said body to place said plug port in and out of fluid communication with said body ports, said plug being of sufficiently smaller radial dimensions than said bore to establish an annular clearance between the opposed surfaces thereof, sleeve means received in said clearance and having ports therein matching said body ports, means maintaining said plug in sealing engagement with said sleeve means during movement from one position to another, said sleeve means being formed of polytetrafluoroethylene and being generally tubular in shape to provide substantial sealing area between the opposed surfaces of said plug and bore, said body including an annular shoulder forming the inner end of each said body port and projecting into said clearance beyond the surrounding portion of said bore, said bore having therein circumferential groove means in axially spaced relation with said ports therein, said sleeve means including integral portions received in said groove means and cooperating with the edges thereof to confine said sleeve means against movement axially of said bore with respect to said ports, means between said body and plug and located between said body ports providing low pressure seal areas between said body bore and said plug and high pressure seal areas surrounding said body ports, said shoulders interfitting with said sleeve ports to confine the surrounding portions of said sleeve means against movement with respect to said bore and flow into said body ports, and said sleeve means being of sufficient thickness to maintain said plug out of contact with said shoulders.

12. A lined plug valve as set forth in claim 11 wherein said annular shoulder forming the inner end of each said body port is integral with said body.

References Cited by the Examiner

UNITED STATES PATENTS

| | | | |
|---|---|---|---|
| 195,707 | 10/77 | Dewrance | 251—171 |
| 1,026,457 | 5/12 | Reynolds | 251—316 |
| 2,694,548 | 11/54 | Stekoll | 251—317 |
| 2,913,219 | 11/59 | Freed | 251—317 X |
| 2,987,295 | 6/61 | Schenck | 251—288 |
| 3,061,269 | 10/62 | Sinkler | 251—317 |
| 3,090,594 | 5/63 | Floyd | 251—317 X |

FOREIGN PATENTS

| | | |
|---|---|---|
| 1,192,348 | 4/59 | France. |
| 8,650 | 6/80 | Great Britain. |
| 596,197 | 7/59 | Italy. |

M. CARY NELSON, *Primary Examiner.*

WILLIAM F. O'DEA, MARTIN P. SCWADRON,
*Examiners.*

UNITED STATES PATENT OFFICE

CERTIFICATE OF CORRECTION

Patent No. 3,199,835                              August 10, 1965

Jacob B. Freed

It is hereby certified that error appears in the above numbered patent requiring correction and that the said Letters Patent should read as corrected below.

Column 2, line 12, for "sectional" read -- section --; column 3, line 71, for "linear" read -- liner --; column 4, line 41, for "shouldesr" read -- shoulders --; column 5, line 29, for "speced" read -- spaced --; line 65, for "161" read -- 151 --; column 6, line 9, after "end" insert -- and --; column 8, line 17, after "plug" insert -- and body --; column 10, line 56, for "8,650  6/80" read -- 8,650  6/88 --.

Signed and sealed this 22nd day of March 1966.

(SEAL)
Attest:

ERNEST W. SWIDER                                    EDWARD J. BRENNER
Attesting Officer                                         Commissioner of Patents